Aug. 4, 1925. 1,548,132
C. E. FRISBIE
SIDE WINDOW STRUCTURE FOR AUTOMOBILES
Filed Jan. 9, 1925 2 Sheets-Sheet 1
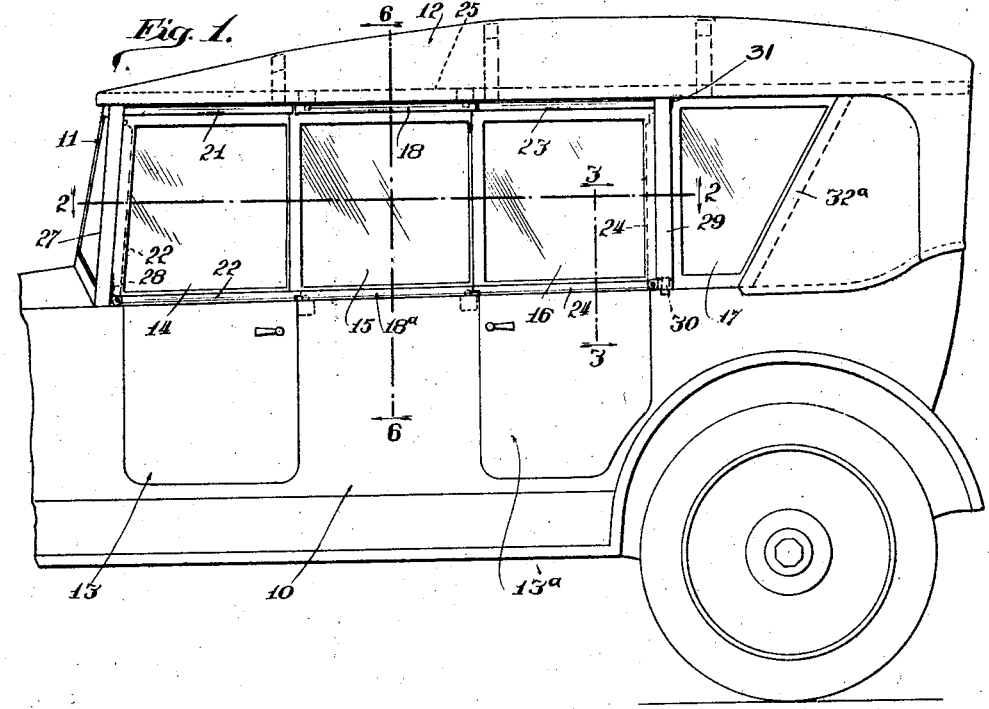
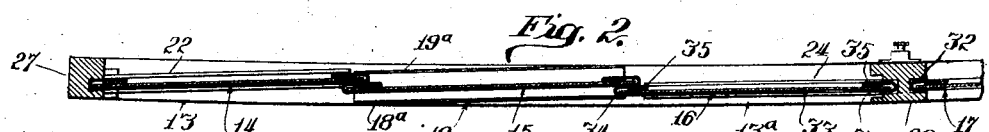
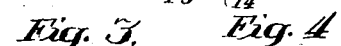
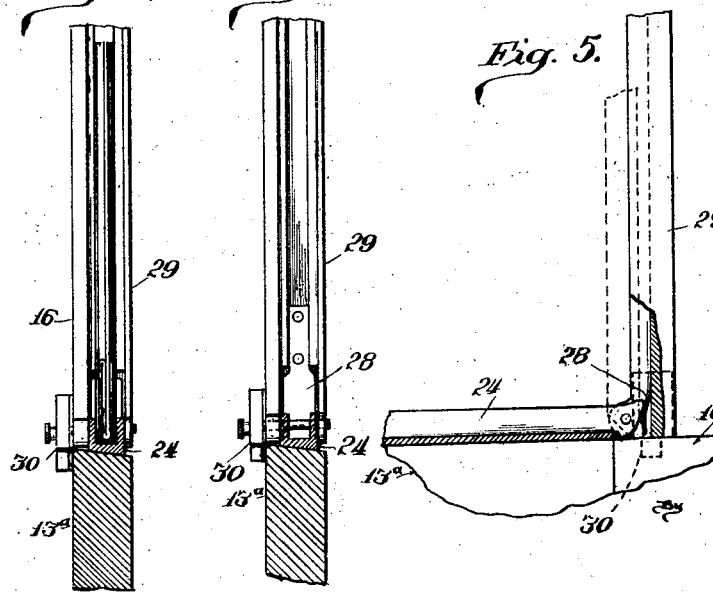

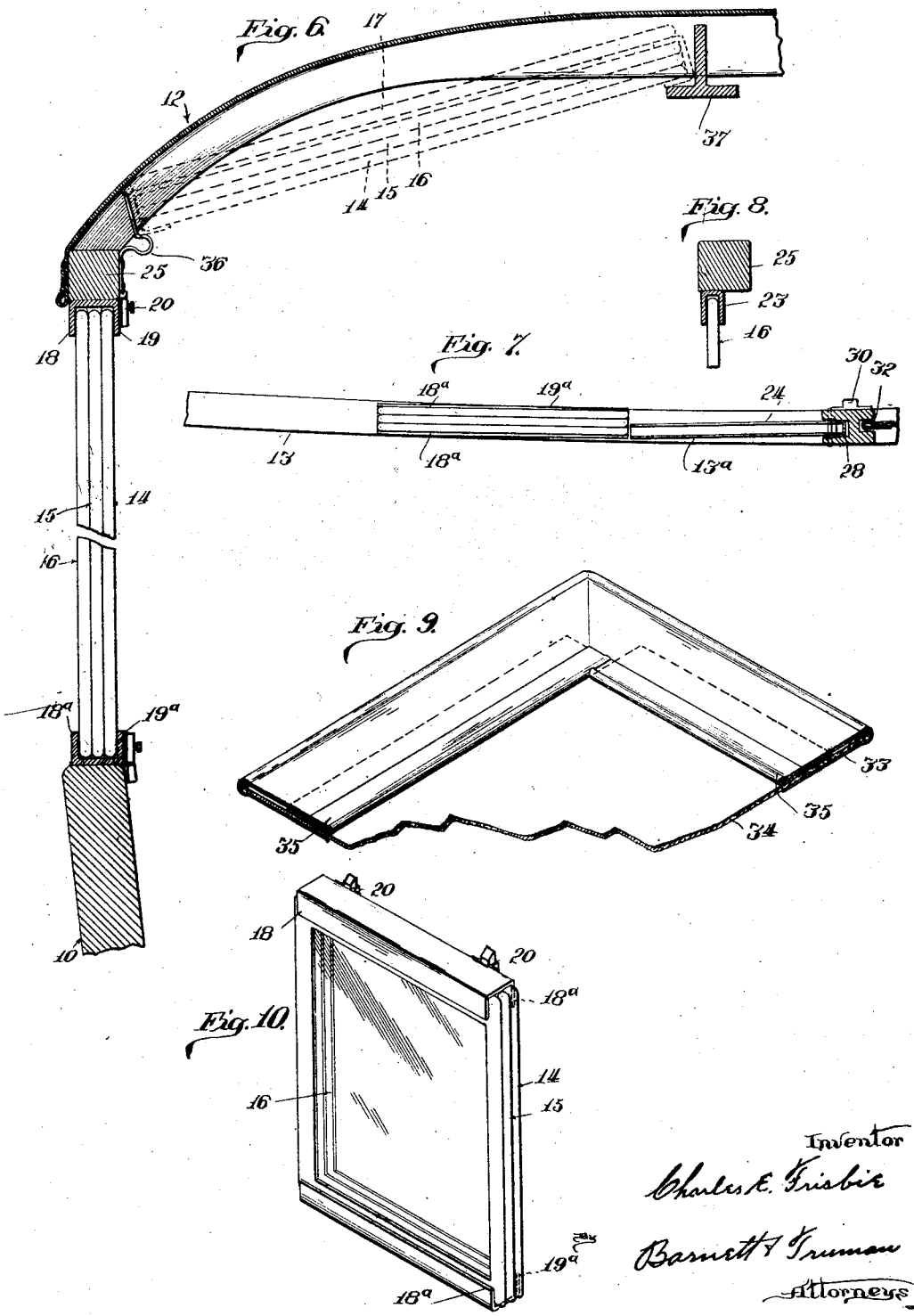

Patented Aug. 4, 1925.

1,548,132

UNITED STATES PATENT OFFICE.

CHARLES E. FRISBIE, OF OAK PARK, ILLINOIS.

SIDE-WINDOW STRUCTURE FOR AUTOMOBILES.

Application filed January 9, 1925. Serial No. 1,410.

*To all whom it may concern:*

Be it known that I, CHARLES E. FRISBIE, a citizen of the United States, residing at Oak Park, in the county of Cook and State of Illinois, have invented certain new and useful Improvements in Side-Window Structures for Automobiles, of which the following is a specification.

My invention relates to side window structures for automobiles and has for its primary object, the provision of an improved structure of the above character which will be suitable for use on the open top or touring car type of automobiles.

A more specific object of the invention is to provide an improved side window structure of the above character, which may be quickly and conveniently applied to an automobile, to close the sides thereof, and which may also be readily removed and stored in the automobile when it is desired to have the sides of the car entirely open. In this connection, I contemplate as a preferred embodiment, the provision of rigid window frame members, which may be moved with relation to each other, to provide a compact arrangement, whereby a plurality of windows may be removed as a single unit from the side of the car and stored in a relatively small space in the upper portion of the automobile top.

Another specific object is to provide a removable side window structure, in which the window elements may be slid back and forth above the side doors, so as not to obstruct the doorway when persons are entering or leaving the automobile.

The invention has for further objects, such other new and improved constructions, arrangements and combinations of parts and devices hereinafter described and claimed, for carrying out the above stated objects and such other objects as will appear from the following description of a preferred embodiment of the invention. In the drawings:

Fig. 1 is a fragmentary side view of an automobile, showing my improved side window construction applied thereto.

Fig. 2 is a section taken on line 2—2 of Fig. 1, looking downward in the direction indicated by the arrows.

Fig. 3 is a vertical section through one of the window elements taken along line 3—3 of Fig. 1, showing the window in its closed position.

Fig. 4 is a section taken along the same line with the window open, so as to show the supporting means for the lower guideway of the window.

Fig. 5 is a fragmentary view, partly in section, of the window guideway.

Fig. 6 is a cross section taken on line 6—6 of Fig. 1.

Fig. 7 is a view similar to Fig. 2 showing the windows moved to the position in which they are arranged immediately before they are removed.

Fig. 8 shows a top guideway for one of the window elements.

Fig. 9 is a view in perspective of a portion of a window frame together with the transparent elements supported in said frame; and Fig. 10 is a view in perspective of three windows in the position which they assume to facilitate their removal as a single unit, and also shows a central guide member for supporting the window members in the arrangement shown.

Referring to the drawings: My invention is applied to an automobile of the open or touring car type, comprising a body 10, windshield 11, and a folding top 12. The particular type of car body herein illustrated, is provided with two side doors 13—13$^a$. This specific construction, however, is employed only for the purpose of illustrating the principles embodied in my invention. It will therefore be apparent that the utility of my invention is not confined to automobiles of the specific construction shown herein, but may be varied in its construction to suit automobiles of various types now in general use.

The preferred embodiment of my invention may be described as consisting of a plurality of window sections 14, 15, 16 and 17, for each side of the automobile, the windows 14 and 15 of which are slidable longitudinally of the car to open and close the spaces above the side doors 13—13$^a$.

The window section 15 is preferably T-shaped in cross-section along its upper and lower edges to provide integral guideways 18—18$^a$, 19—19$^a$, which receive the windows 14 and 16, when they are in their opened position, or when the window structure is removed from the side of the car. This construction permits the windows 14, 15 and 16 to be disposed in a compact arrangement, as shown in Fig. 10, so that these windows, together with the supporting guideways 18—18ª, and 19—19ª, may be readily applied to or removed from their operative position as a single unit. When the windows, in the compact arrangement shown in Fig. 10 are applied to the side of the car (Fig. 6), the guideways along the upper and lower edges of the window section 15, are latched to the side framing of the top structure and to the body of the automobile by any suitable devices, such, for example, as spring latches 20. When the guideways 18—18ª, 19—19ª, are in their operative position, as above set forth, they register with upper and lower guideways 21 and 22, adapted to support the window 14 in its closed position and with similar guideways 23—24 adapted to support the window section 16, in its closed position. The guideways 21 and 23 are preferably secured rigidly to the side frame 25 of the top structure, and the bottom guides 22 and 24 are hinged so that, when the windows 14 and 16 are opened, the guideways 22 and 24 may be raised to the dotted line position shown in Fig. 1, so as to permit passengers to enter or depart from the car. The guideways 22 and 24 preferably overlap the guideways along the lower edge of the window section 15, so as to insure proper alignment of these guideways and also provide a support for these guideways independent of the side doors.

The wind shield end frame 27 is preferably channel-shaped in cross section, so as to receive the pivoted guideway 22 when it is raised to the dotted line position of Fig. 1, and thereby provide a door space of maximum width. In order to minimize vibration of the parts and avoid noise resulting from such vibration, a spring 28 is secured in the channel member 27, so as to bear against the pivoted end of the guideway 22. This end of the guideway is preferably pivoted off center, and formed with a cam shaped end so that the spring 28 will hold the guideway in its lowered or in its elevated position. The guideway 24 is pivoted in a similar channeled post member 29. This post member is preferably latched by means of a spring latch 30, to the car body and is hinged at its upper end to the frame 25 of the top structure, by a hinge 31, so that the guideway 24 and the post 29 may both be swung up into the top structure of the car, and secured in their elevated position when it is desired to open the entire side of the automobile.

The window 17 is preferably supported so as to slide vertically in a guideway 32 formed in the hinged post 29 (Fig. 2), and in a diagonally disposed guideway 32ª. This window is of such configuration that it may be readily removed from its guideways by sliding it a short distance vertically.

The window frames are formed by bending metal strips to provide relatively thin channel members 33 to receive the edges of the window pane 34. The window panes may consist of any of the well-known transparent materials suitable for use as window panes, for example, glass, mica or celluloid. The window panes are inserted in their respective frames and firmly clamped in proper position by means of removable clip elements 35, which press the window panes against the opposite side of the channel members 33. With this construction the windows may be made strong and rigid, yet relatively light in weight, so that they may be easily handled during their application or removal from their operative position, and also permit them to be made relatively thin, so that they can be conveniently stored in a relatively small space within the automobile.

In the drawings I have illustrated my preferred means for supporting the window frames when the same are removed, which means comprises a spring bracket for supporting one end of the windows, and a rigid T member 37 for supporting the other end.

In applying the windows, the post 29 is swung down into latching engagement with the body of the automobile and the guideways 22 and 24 are lowered from the dotted line position of Fig. 1 to the full line position of that figure. The three windows 14, 15 and 16, together with the guideways formed integrally with the window section 15, are positioned between the upper edge of the car body and the top frame 25, as shown in Fig. 6. The windows 14 and 15 may then be slid longitudinally of the car to their respective positions above the doors 13 and 13ª. From the foregoing it will be seen that the window structure can be applied or removed from the side of the automobile without requiring any of the occupants of the automobile, to get out of the car.

The spring-supporting bracket 36 will yield sufficiently to permit the windows to be engaged by the T member 37, and at the same time will exert sufficient pressure against the windows to hold them in firm contact with the T member, so as to prevent accidental dislodgment or rattling.

While I have described my invention in one specific embodiment, it will be obvious that various structural changes may be made without departure from the spirit of my invention. I therefore wish it understood that I contemplate all such changes in structure as come within the scope of the appended claims.

I claim:

1. The combination with the body and top framing of an automobile, of a side window structure for closing the space between the said body and said top framing, comprising a window section provided with guideways thereon, and adapted to be removably supported in the space between said body and the top framing, and a plurality of slide windows carried by said window structure and adapted to be moved longitudinally of said automobile body, and adapted to be applied and removed with said window structure as a single unit, and means for supporting said window section and slide windows in the top portion of the automobile, comprising a rigid supporting member and a spring member adapted to yield to permit insertion of the window members between said rigid supporting member and said spring.

2. The combination with the body of an automobile having side doors therein, and the automobile top framing, of a side window structure for closing the space between said body and the top frame, comprising a window section removably supported between said body and said framing, slide windows carried by said window section, and adapted to be moved longitudinally of said body across the spaces above said doors, and guideways pivoted to the automobile and adapted to receive said slide windows when they are moved to a position above said doors.

3. The combination with the body of an automobile having side doors therein, and the automobile top framing, of a side window structure for closing the space between the said body and the top framing, comprising a window section removably supported between the said body and the top framing, slide windows carried by said window section and adapted to be moved longitudinally of said body across the spaces above said doors, guideways pivoted to the automobile and adapted to receive said slide windows when they are moved to a position above said doors, and spring devices for holding said pivoted guideways in their operative and inoperative positions.

4. The combination with the body of an automobile having side doors therein, and an automobile top frame, of a side window structure for closing the space between said body and top framing comprising a window section removably supported between the said body and the top framing, slide windows carried by said window section and adapted to be moved longitudinally of said body across the spaces above the doors, guideways pivoted to be moved vertically across the doorways of said doors and adapted to receive the slide windows when they are moved to a position above said doors, and spring members for holding said guideways in their lowered and elevated positions.

5. The combination with the body of an automobile having side doors therein and the automobile top framing, of a side window structure for closing the space between the said body and top framing comprising a window section removably supported between the said body and the top framing, slide windows carried by said window section and adapted to be moved longitudinally of said body across the spaces above said doors, guideways secured to the top framing above said doors, and guideways pivoted to the automobile and adapted to be moved to a position across the top of said doors, and adapted to receive said slide windows when they are moved across said doors.

6. The combination with the body of an automobile having side door openings and with the top framing, of a side window structure for closing the space between the body and the top framing, comprising a window section removably supported between said body and the top framing, slide windows carried by said window section adapted to be moved longitudinally of said car, channel-shaped posts extending from said body to the top framing, guideways pivoted to said posts and adapted to fold into the channel portion thereof when in their inoperative position, and adapted to be lowered to receive the slide windows when said windows are moved to extend over said doors.

7. The combination with the body of an automobile having side door openings and with the top framing, of a side window structure for closing the space between the body and the top framing, comprising a window section removably supported between said body and the framing, means for detachably securing the said window section to the body and top framing respectively, slide windows carried by said window section and adapted to be moved longitudinally of the car, channel shaped posts extending from said body to the top framing, guideways pivoted to said post and adapted to fold into the channel portion thereof when in their inoperative position and adapted to be lowered to receive the slide windows when they are moved to extend over said doors.

8. The combination with the body of an automobile having side door openings and with the top framing of the car, of a side window structure for closing the space between said body and said top framing, comprising a window section removably supported between said body and the said top framing, means for detachably securing said window section to the said body and the said top framing, respectively, slide windows carried by said window section and adapted to be moved longitudinally of the car body, channel-shaped posts extending from said body to the top framing, one of which posts is pivoted to the top framing so as to swing upwardly into the top structure, guideways pivoted to said posts, and adapted to fold into the channeled portion thereof when in their inoperative position and adapted to be lowered to receive the slide windows when they are removed to extend over said doors.

9. The combination with the body of an automobile having side door openings and with the top framing of said window structure for closing the space between the body and the top framing of the car, comprising a window section supported between said body and the top framing, slide windows carried by said window sections and adapted to be moved longitudinally of the car across the side doors thereof, post members extending from said body to the top framing of the car, guideways pivoted to said posts and adapted to move vertically to open or closed position across the door openings, one of said posts being hinged to the top framing and provided with means for latching the same in its operative position, and means for latching said window section in operative position.

10. The combination with the body and the top framing of an automobile, of side window structures for closing the space between said body and said top framing, comprising a window structure formed with guideways adapted to receive slide window members so as to slide on opposite sides of said window structure, guideways secured to the window framing at opposite sides of said window section so as to register with the guideways thereof, pivoted guideways adapted to be lowered to a position along the upper edge of the body portion so as to register with the lower guideways of said window section, whereby the slide windows may be moved in opposite directions longitudinally of the car body.

11. The combination with the body and the top framing of an automobile, of a side window structure for closing the space between the body and the top structure of said automobile, comprising a fixed window section and window sections slidable longitudinally of the body, a post hinged to the top framing and having a latching engagement with the body of the automobile, so as to provide a stop for one of said slide windows, guideways on said hinged post, a guideway extending diagonally from said car body to the top framing, and a window vertically slidable in said guideway.

CHARLES E. FRISBIE.